United States Patent [19]

Videtto

[11] 4,218,256
[45] Aug. 19, 1980

[54] METHOD OF FORMING SLIDE GATE VALVE PARTS

[75] Inventor: Ralph B. Videtto, Pleasanton, Calif.

[73] Assignee: Kaiser Aluminum & Chemical Corporation, Oakland, Calif.

[21] Appl. No.: 18,075

[22] Filed: Mar. 6, 1979

[51] Int. Cl.$^2$ .............................................. C04B 35/04
[52] U.S. Cl. ........................................ 106/58; 106/85
[58] Field of Search ..................... 106/58, 85; 222/600

[56] References Cited
U.S. PATENT DOCUMENTS 3,960,580    6/1976    Stierli et al. ............................ 106/85

Primary Examiner—James Poer
Attorney, Agent, or Firm—Paul E. Calrow; Malcolm McQuarrie

[57] ABSTRACT

Upper and lower plates, as well as other parts, for a slide gate valve are formed by casting into a mold, preferably a metal mold, a castable refractory composition containing from 1 to 5% of a long chain glassy polyphosphate, preferably one having an average chain length of about 20 phosphorous atoms, from 0.1 to 0.5% boric acid, the balance of the castable being sized periclase refractory grain.

10 Claims, No Drawings

METHOD OF FORMING SLIDE GATE VALVE PARTS

BACKGROUND OF THE INVENTION

This invention concerns a method of forming slide gate valve parts by casting an admixture of water and a castable refractory composition into a form.

Slide gate valves are well-known devices used to control the flow of molten metal, for example steel, from a vessel such as a ladle or tundish. In these devices, a movable or sliding plate with a hole or passage for the molten metal slides or rotates into and out of registry with a hole or passage in a fixed plate attached to the vessel containing the molten metal to permit or stop the flow of metal through the passages. One typical such device is shown in U.S. Pat. No. 4,063,668.

In these devices, the fixed, so-called "upper plate", and the movable, so-called "bottom plate", each containing a hole or passage for molten metal, are the primary wear pieces and consequently have to be replaced frequently, for example after pouring one heat of steel. Accordingly, the slide gate valve must be repaired by frequently replacing these wearing parts. It is the making of these frequently replaced parts with which the present invention is concerned.

It is conventional to make these upper and lower plate parts by forming and firing refractory plates and then placing them in a bed of mortar in metal casings, the entire assembly being placed in the slide gate valve; see U.S. Pat. No. 3,841,539. After this assembly has hardened, it is necessary to grind the flat sliding surface of the assembly (in the case of a bottom plate, the surface which will be in contact with the corresponding surface of the upper plate) so as to achieve a very smooth sliding surface which will provide a tight metal-sealing joint and also to achieve the very strict dimensional tolerances required in these devices.

It has been suggested that these replacement parts be formed by casting refractory material into the metal casings, again grinding the sliding surface to achieve flatness; see French Patent Application No. 77/01683.

It is also known to place the metal casing or other form against a very smooth, almost mirrorlike, surface such as that provided by a polished metal or very smooth plastic surface, and to cast refractory material in this mold assembly, preferably using vibration to assure complete filling; see U.S. Ser. No. 930,785 filed Aug. 3, 1978. The great advantage of this method of making slide gate parts is that they can be made to great dimensional accuracy and the surface cast against the polished plate does not need to be ground prior to placing the part in service. This obviously results in lower manufacturing costs. The present invention is an improvement on this method of forming slide gate parts.

The castable refractory used in this latter method of forming parts must meet several stringent requirements: It must flow readily under vibration so as to completely fill the mold. It must be fluid enough so that any entrained air bubbles can rise to the top of the mold or to holes in the mold surface to be removed. On the other hand, it must not be so fluid that segregation of the coarse and fine particles of refractory occurs, which would lead to a poor surface. The refractory composition must form a very smooth, flat surface on the sliding face of the part. Finally, the composition must release cleanly from the highly polished plate so that there is no pitting or other flaw in the sliding surface.

SUMMARY OF THE INVENTION

It has now been found according to this invention that a slide gate valve part can be made by casting an admixture of water and a castable refractory into a form wherein the castable refractory consists essentially of (a) from 1 to 5% of a long chain glassy polyphosphate and (b) from 0.1 to 0.5% boric acid, the balance of the castable refractory being sized periclase refractory grain, all percentages being by weight based on the total weight of grain, polyphosphate, and boric acid.

DETAILED DESCRIPTION

The periclase refractory grain used will contain at least 90%, preferably 95% or more MgO. It should be a relatively high strength grain; that is to say, it preferably contains CaO and $SiO_2$ in such proportions that the lime:silica ratio is 2 or more. For example the grain will contain 2% or more CaO and preferably 1% or less $SiO_2$. Although it is not certain, and applicant does not wish to be bound to a particular theory, it is believed that the polyphosphate reacts with the lime (CaO) in the periclase to form a major bond, and that better bonding is achieved with a relatively high lime periclase grain. In addition, the grain will contain minor amounts of normal impurities such as $Al_2O_3$ and $Fe_2O_3$. The grain will preferably be of relatively high density, for example it will have a bulk specific gravity (bsg) of 3.4 or more. For the grain to be of high bsg, it should have a relatively low boron content, for example less than 0.1% $B_2O_3$. The grain will be sized to achieve good packing, as is well-known in this art. For example, it will all be smaller than 3.3 mm (i.e., pass a 6 mesh screen), and about 25% of it will be smaller than 44 microns (i.e., pass a 325 mesh screen).

The long chain glassy polyphosphate used will be one of several well-known materials of commerce. For reasons of economy, it will generally be a sodium polyphosphate, but other varieties can be used. As is well-known, these polyphosphates have the general chemical formula $Na_{n+2}P_nO_{3n+1}$ where "n", the number of phosphorous atoms in the chain, is at least 4. It is preferred that the polyphosphate used in this invention have an average chain length of about 20, for example 21. The use of these materials as bonds for refractories is shown in U.S. Pat. No. 3,304,187. Preferably the polyphosphate is used in granular (e.g., all less than 2.4 mm--all passing an 8 mesh screen), anhydrous form (i.e., showing an ignition loss of less than 1%). However, a water solution of the material can be used, with appropriate adjustment of the amount used to allow for the actual amount of polyphosphate in the solution. In other words, the percentages given in the specification and claims for the amount of polyphosphate refer to anhydrous material.

Boric acid ($H_3BO_3$) is a well-known material of commerce. It, too, is used in granular form, preferably all smaller than 0.6 mm (i.e., all passing a 28 mesh screen). The amount of boric acid used is critical: If it is omitted or too little is used, the mix will be too stiff and will not flow adequately to fill the voids in the mold and permit removal of bubbles. The inclusion of boric acid also reduces the possibility of cracking in the cast part during drying. On the other hand, if too much boric acid is used, the part will be harder to dry, i.e., take an excessively long time, and will tend to stick to the smooth plate.

In carrying out the method of this invention, the refractory grain, polyphosphate, and boric acid will be mixed dry, for example in a paddle-type mixer, until the polyphosphate and boric acid are well distributed in the grain, for example for 2 minutes. After this, water will be added to the admixture, followed by further mixing, for example for 5 minutes, until the polyphosphate is dissolved. The mix will gradually appear wetter as the polyphosphate goes into solution. The acceptable water range for any given composition is quite narrow. The actual amount used will depend on such things as the sizing of the refractory grain, the particular polyphosphate used, and the batch size. If insufficient water is used, the material will not flow properly during the vibration casting. If too much water is used, the fines will tend to migrate away from the surface being cast against the smooth plate, resulting in a surface less smooth than desired. It may be possible to add agents, for example a wetting agent, to the mix to reduce the amount of water required for casting.

As suggested, the casting will preferably be done while vibrating the mold, for example at a frequency of 10,000 vibrations per minute (vpm). The vibration will be continued for an adequate length of time to fill the mold properly, but will not be continued so long as to result in segregation within the mold. The actual vibration time will depend on such things as the size of the piece being cast, the amplitude of vibration, and the frequency. After casting, the part is dried to essentially constant weight, for example for at least 6 hours at 150° C. However, where a plastic is used as the smooth casting plate, the unit must be dried at a lower temperature, for example 90° C., for a sufficient length of time to set the casting, and the plastic plate removed before subjecting the casting to a higher temperature. The dried unit will be shipped to the user, for example a steel maker, who will place it in a slide gate valve.

It will be understood that in casting the part, a mandrel is placed within the mold to form the hole or bore through which molten metal passes when the part is in use. If desired, a preformed insert, for example fired zirconia, can be placed about the mandrel to line all or part of the bore.

EXAMPLE 97.5 parts by weight of a refractory grain all smaller than 3.3 mm (−6 mesh), 23.4 parts of which were finer than 44 microns (−325 mesh), and having the following typical chemical analysis (on a weight percent basis): 2.3% CaO, 0.7% $SiO_2$, 0.2% $Al_2O_3$, 0.2% $Fe_2O_3$, 0.03% $B_2O_3$, and (by difference) 96.6% MgO, were admixed with 2.3 parts by weight of the long chain polyphosphate sold under the trade name Glass H (by FMC company), all the polyphosphate being smaller than 2.4 mm (−8 mesh), having an average chain length of 21 phosphorous atoms, containing about 31% $Na_2O$ and 69% $P_2O_5$ and having an ignition loss of about 0.5%, and 0.2 parts granular boric acid all smaller than 0.6 mm (−28 mesh). The refractory grain had a bsg of 3.41. These ingredients were dry mixed for 2 minutes in a Hobart mixer and then 6.25 parts water added and the mixing continued for a further 5 minutes. This admixture was then cast into a metal casing (for an integral bottom plate and collector nozzle assembly) clamped against a one-half inch thick phenolic laminated sheet, a rubber gasket being placed between the metal casing and the phenolic plate and a wax-coated mandrel placed in the mold to form the bore or passage for molten metal. The phenolic was coated with oil prior to the casting, which was done while subjecting the mold to a vibration of 10,000 vpm frequency. After the mold was filled, the vibrations were reduced to 8,000 vpm and continued for 3 more minutes. During this additional vibration, further material is added to the mold to maintain the level of refractory even with the top of the metal casing.

After casting, the piece was dried at room temperature for 16 hours, and then for 2 hours at 71° C. (160° F.), after which the phenolic plate, gasket and mandrel were removed. The piece was then further dried at 150° C. (300° F.) for 12 hours, after which it was ready for use. The cast piece had a smooth finish free of cracks and voids on its sliding surface, and was placed in use in a slide gate valve structure without any grinding.

When subjected to the standard flame test used to test such parts (wherein an oxy-propane flame is passed across the sliding surface of the plate at a speed of 10 cm (4 inches) per minute and at a distance of 6 mm (0.25 inch) from the surface), the plate showed no cracking or spalling.

A similarly formed bottom plate was placed in a slide gate valve attached to a steel casting ladle and used for casting two heats of steel. After this use, the bore of the plate showed no erosion and the top, sliding surface was not worn.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns. Analyses of mineral components are reported in the usual manner, expressed as simple oxides, e.g. CaO and $SiO_2$, although the components may actually be present in various combinations, e.g. as a calcium silicate.

I CLAIM:

1. Method of forming a slide gate valve part by casting an admixture of water and a castable refractory into a form wherein the castable refractory consists essentially of (a) from 1 to 5% of a long chain glassy polyphosphate and (b) from 0.1 to 0.5% boric acid, the balance of the castable refractory being sized periclase refractory grain, all percentages being by weight based on the total weight of grain, polyphosphate, and boric acid.

2. Method according to claim 1 wherein the periclase grain contains at least 90% MgO.

3. Method according to claim 2 wherein the periclase grain contains at least 95% MgO.

4. Method according to claim 3 wherein the periclase grain contains about 96.5% MgO and at least 2% CaO and has a lime:silica ratio of at least 2.

5. Method according to claim 1 wherein the long chain polyphosphate has an average chain length of about 20 phosphorous atoms.

6. Method according to claim 4 wherein the long chain polyphosphate has an average chain length of about 20 phosphorous atoms.

7. Method according to claim 6 wherein the castable refractory contains about 0.2% boric acid.

8. Method according to claim 1 wherein the refractory castable is cast into a metal form.

9. Method according to claim 1, 2, 3, 4, 5, 6, 7 or 8 wherein the refractory castable, prior to casting, is admixed with from 5 to 8 weight percent water, based on the total weight of refractory grain, polyphosphate, and boric acid.

10. Method according to claim 9 wherein about 6% water is used.

* * * * *